United States Patent [19]

Invernizzi et al.

[11] 4,347,162
[45] Aug. 31, 1982

[54] CATALYST FOR THE POLYMERIZATION OF ALPHA-OLEFINS

[75] Inventors: Renzo Invernizzi, Milan; Ferdinando Ligorati, Usmate; Maurizio Fontanesi, Concorezzo; Roberto Catenacci, Milan, all of Italy

[73] Assignee: Euteco Impianti S.p.A., Milan, Italy

[21] Appl. No.: 241,288

[22] Filed: Mar. 6, 1981

[51] Int. Cl.³ .............................................. C08F 4/64
[52] U.S. Cl. .............................. 252/429 B; 526/124; 526/125
[58] Field of Search ..................................... 252/429 B

[56] References Cited

U.S. PATENT DOCUMENTS

| | | | |
|---|---|---|---|
| 3,859,231 | 1/1975 | Kochhar et al. | 252/429 B |
| 4,143,223 | 3/1979 | Toyota et al. | 252/429 |
| 4,146,502 | 3/1979 | Yokoyama et al. | 252/429 B |
| 4,220,554 | 9/1980 | Scata et al. | 252/429 B |
| 4,224,184 | 9/1980 | Staiger | 252/429 B |
| 4,239,650 | 12/1980 | Franke et al. | 252/429 B |
| 4,293,673 | 10/1981 | Hamer et al. | 252/429 B |

OTHER PUBLICATIONS

Catenacci et al., Chem. Abstracts 94 (1981), #66446.
Ligorati et al., Chem. Abstracts 93 (1980) #187024.

*Primary Examiner*—Arthur P. Demers
*Attorney, Agent, or Firm*—Sughrue, Mion, Zinn, Macpeak & Seas

[57] ABSTRACT

Ziegler catalytic system formed of an organometallic compound of a metal of Group I, II or III of the Periodic System in combination with a transition metal compound supported on a carrier.

The carrier is prepared by reacting magnesium chloride with an aliphatic alcohol and a fluorine-containing compound at 100°–200° C. to obtain an active complex comprising 2–15 wt. % of fluorine and 0.4–11 wt. % of alcoholic hydroxyl groups.

The catalytic system may be used for the polymerization of alpha-olefins.

16 Claims, No Drawings

CATALYST FOR THE POLYMERIZATION OF ALPHA-OLEFINS

The present invention relates to a process and to a supported catalyst for the polymerization and copolymerization of alpha-olefins at low pressure. In particular the invention relates to the production of a support which is particularly suitable for the said catalyst.

It is known that it is possible to polymerize alpha-olefins at low pressures by means of Ziegler catalysts generally formed of a catalytic component consisting of a compound of an element from groups IV to VI of the periodic system in combination with an organometallic compound of an element from groups I to III of the periodic system, the reaction being carried out either in suspension, in solution, or in the absence of diluents and solvents.

Polymerizing processes are also known in which the catalytic components are supported on a solid, generally inorganic, carrier. Thus, for example, according to U.S. Pat. No. 3,166,442, the transition metal compound is fixed to a silica, alumina or like carrier having reactive hydroxyl groups on its surface. Other supports which are suitable for this purpose are hydroxychlorides of divalent metals and oxygen-containing compounds of divalent metals, these latter being substantially free from hydroxyl groups and generally being chosen from oxides, sulphates, nitrates, phosphates, silicates and polycarboxylates of calcium and magnesium. For a better understanding of these catalysts, one may refer to the specifications of Belgian Pat. No. 650,679, French Pat. No. 1,448,320 and British Pat. No. 1,140,649.

The catalysts described above generally require relatively high pressures for the polymerization and/or result in rather low polymerization activities, such that it is usually necessary to wash the final polymer to purify it of residues of the catalytic system.

According to other known methods, the supports for the olefin-polymerization catalyst, for example alumina, silica and magnesium oxide, are halogenated in order to increase the activity of the catalyst finally obtained, thus avoiding the costly final washing of the polymer, as described in British Pat. Nos. 1,314,784 and 1,315,770. Other active catalysts are obtained by pretreating a divalent metal halide with an electron donor, as described in the specification of the published German patent application DAS No. 1,939,074.

These catalysts, although having a high activity in the polymerization of olefins, do not allow the average molecular weight of the polymer to be regulated easily and thus the products obtained are often difficult to work due to their high Melt-Index values.

It has now been found possible to overcome the disadvantages of the known art by the adoption of a new support for Ziegler-type catalysts for polymerizing and copolymerizing alpha-olefins.

One object of the present invention is, therefore, to provide a new support, of a complex nature, suitable for catalysts for the polymerization and copolymerization of alpha-olefins at low pressure.

Another object of the present invention is to provide catalysts including such a support.

A further object of the invention is to provide a process for polymerizing or copolymerizing alpha-olefins by means of the said catalysts.

Other objects of the invention will become clear from the following description.

The invention provides a Ziegler catalytic system formed by the combination of an organo-metallic compound of a metal of Group I, II or III of the Periodic System of the elements and a catalytic component formed of a compound of a transition metal of group IV, V or VI of said Periodic System supported on a carrier, characterized in that said carrier is an active solid complex obtained by reacting magnesium chloride with an aliphatic alcohol and a fluorine-containing compound at a temperature of from about 100° C. to about 200° C., said complex comprising from 2 to 15% by weight of fluorine and from 0.4 to 11% by weight of alcoholic hydroxyl groups.

According to the present invention, the support for the catalyst is prepared from magnesium chloride, an aliphatic alcohol and a compound containing fluorine. The alcohols are generally chosen from those containing from 1 to 5 carbon atoms per molecule, ethanol being preferred. The fluorine-containing compounds are generally chosen from hydrofluoric acid, ammonium fluoride, fluorides of phosphorus, or their mixtures, or more generally any of those organic or inorganic substances containing fluorine which have a fluorinating action under the reaction conditions. Fluorine per se is also useful for the purpose.

In the preparation of the support, the reagents are generally contacted and then heat-treated at a temperature of from 100° to 200° C. In practice the reaction may be carried out by forming a solution in the chosen alcohol of the other reagents and heat-treating the solution, with removal of the alcohol in excess.

An inert diluent such as an aliphatic or aromatic hydrocarbon having a boiling point greater than that of the alcohol used may be present in the solution. In order to prepare the solution, the magnesium chloride may be mixed directly with the chosen alcohol and with the fluorinating agent, a diluent possibly being added. In a preferred embodiment, the fluorinating agent is dissolved in the chosen alcohol and the magnesium chloride, suspended in a diluent, for example n-dodecane, is added to the solution obtained. After the magnesium chloride has dissolved, the mixture is heat-treated and the excess alcohol is removed; this may be effected by simple evaporation or by treatment in a spray drier. In the first case a support is obtained in the form of hexagonal scales with an average grain size of the order of 10 to 100 microns. In the second case the support is in the form of spheroidal particles with an average grain size still within the range 10 to 100 microns but depending on the operating conditions. Hence a support with a desired particle size may be obtained by regulating the operating parameters.

The support may also be prepared under "dry" conditions by mixing the desired quantities of the constituents without using an excess of alcohol. The mixture is then reacted, possibly in the presence of an inert diluent. For the dry process, a magnesium chloride with a suitable grain size (generally of the order of 60 microns) is chosen and the drgree of dryness of this magnesium chloride is important, its water content preferably being less than about 1% by weight.

This degree of dryness is less critical when the preparation is carried out in solution, in which case magnesium chloride with a water content not exceeding 5% by weight may be used.

The reaction temperatures used in the preparation of the support are generally from about 100° C. to about 200° C. Temperatures lower than the minimum limit indicated do not result in interaction between the reagents, or result in a degree of interaction which is undesirably low. With temperatures greater than the maximum value indicated, supports are obtained with low specific surface areas which give rise to catalysts with low reactivity. The best results are generally obtained within a temperature range of from 120° C. to 160° C.

The fluorine content of the support is maintained at values of from 2 to 15% by weight in that values lower than 2% by weight do not give any significant advantage, while with values greater than 15% by weight catalysts are obtained with low values of the activity and productivity. The best results are obtained with quantities of fluorine in the support within the range 3 to 10% by weight. The fluorine content of the support essentially depends on the quantity of fluorinating agent used in the preparation of the support.

The content of alcoholic hydroxyl groups in the support is maintained at values of from 0.4 to 11% by weight, in that values lower than 0.4% by weight do not give any significant advantage, while with values greater than 11% by weight catalysts are obtained which produce polyolefins with undesirably high values of the Melt-Index and with a high wax content. The best results are obtained with supports having an alcoholic hydroxyl group content of 4 to 9% by weight. The quantity of alcoholic hydroxyl groups which remains in the support finally obtained depends essentially on the temperature chosen for the reaction, the values of which have been indicated above. Thus the temperature constitutes a fundamental parameter for regulating the alcoholic hydroxyl content of the support.

The pressure at which the support is prepared is not critical and, in general, the preparation is effected at atmospheric pressure or with a slight over-pressure, for example up to 1 kg/cm$^2$.

The supports obtained by means of the processes described above have porosity and specific surface area values which are higher than those of supports which are formed from magnesium chloride treated simply with an alcohol, such as ethyl alcohol, according to the teaching of the known art. Typically the supports of the invention have a porosity of the order of 0.75 ml/g and a specific surface area of the order of 70 m$^2$/g whereas the known supports which are free from fluorine typically have a porosity of the order of 0.5 ml/g and a specific surface area of about 40 m$^2$/g. Moreover the action of the fluorine confers a greater surface acidity on the support and probably induces the formation of complex magnesium fluorides, alkyl fluorides and the like. For all these reasons the support has been defined as complex.

According to the present invention, the support described above is reacted with a compound of a transition metal chosen from groups IV to VI of the periodic system. The transition metal compounds which are particularly useful are halides, oxyhalides and alkoxyhalides or alcoholates. The preferred transition metals are titanium, vanadium and chromium. Specific examples of the transition metal compounds are $TiCl_4$, $TiBr_4$, $VCl_4$, $VOCl_3$, $VOBr_3$, $CrO_2Cl_2$, $Ti(OC_2H_5)_3Cl$, $Ti(O\text{-iso-}C_4H_9)_2Cl_2$, $Ti(OC_2H_5)_4$ and $Ti(O\text{-iso-}C_4H_9)_4$. The best results are obtained with $TiCl_4$.

The interaction between the support and the transition metal compound may be carried out by using conventional methods.

The said transition metal compound may be added to the support either as it is or dispersed or dissolved in an inert carrier, generally a paraffin (for example n-heptane, n-dodecane, etcetera). The temperature for the treatment in question is not critical and may, in general, vary from ambient temperatures (20° to 25° C.) up to about 150° C. The time for the treatment is that necessary to bind to the support the desired quantity of transition metal, which, in the case of titanium, may vary from 0.05 to 15% by weight and preferably from 1 to 5% by weight with respect to the weight of the support. Finally, if there is used an excess of transition metal compound the quantity which can be fixed on the support the quantity in excess is removed.

In general, the interaction conditions, such as relative amounts and interaction time, are regulated so as to obtain a supported catalytic component with a hydroxyl group content of from 0.03 to 5 wt.%, preferably from 0.5 to 4 wt.%, taking also into account that part of the hydroxyl groups is involved in the interaction with the transition metal compound.

The fluorine content of the supported catalytic component generally ranges from 1 to 14% by weight, best results being generally obtained with values of from 3 to 8% by weight.

The catalytic component thus obtained is then activated by means of the addition of an organometallic compound of a metal chosen from groups I to III of the periodic system. Suitable organometallic compounds are metal-alkyls, the halides or hydrides of metal-alkyls or even Grignard compounds. Examples of suitable metals are aluminum, zinc, magnesium, sodium and lithium. Examples of the organometallic compounds are $Al(CH_3)_3$, $Al(C_2H_5)_3$, $Al(\text{iso-}C_4H_9)_3$, $Li(C_4H_9)$, $Al(C_2H_5)_2Cl$, $Al(C_2H_5)_2Br$, $Al(C_2H_5)_2H$, $Al(\text{iso-}C_4H_9)_2H$, $Al_2(C_2H_5)_3Cl_3$ and $(C_2H_5)MgBr$.

The best results are obtained with the aluminum alkyls and with the halides and hydrides of aluminum-alkyls and especially with triethyl-aluminum and tri-isobutyl aluminum.

The molar ratio between organometallic compound and transition metal compound (this latter bound to the support) in the catalyst is not particularly critical and may, in general, vary from 50:1 to 1000:1, with preferred values of the order of 100:1 to 500:1.

The catalysts of the present invention have high activities and productivities in the polymerization of the olefins, especially in the polymerization of ethylene. In particular, other conditions being equal, they have a higher productivity, expressed as grams of polymer per gram of catalyst and per hour and a much higher activity expressed as kilograms of polymer per gram of transition metal and per hour, than catalysts which are supported on magnesium chloride treated simply with an alcohol.

Such conventional supports typically fix a quantity of titanium of the order of 5% by weight and give rise to catalysts with a productivity of the order of 10,000 grams of polyethylene per gram of catalyst and per hour. Such a polyethylene has a residual titanium content of about 5 to 10 ppm.

The support of the present invention typically fixes a quantity of titanium of the order of 2% by weight or even less and gives rise to a catalyst with a productivity of the order of 20,000 grams of polyethylene per gram of catalyst and per hour. Such a polyethylene has a residual titanium content of about 1 ppm or less.

A fundamental advantage of the catalyst of the present invention lies in the easy regulation of the average molecular weight of the polyolefin or, equivalently, of its Melt-Index.

The regulation is achieved essentially by suitable proportioning of the quantity of fluorine and of the alcoholic hydroxyl groups present in the support, account being taken of the fact that fluorine promotes the formation of high molecular weight polymers while the alcoholic hydroxyl groups promote the formation of low molecular weight polymers. Hence the desired molecular weight may be obtained by appropriate metering of the two constituents, within the range of values indicated above.

The catalysts of the present invention are useful for polymerizing or copolymerizing alpha-olefins having from 2 to 6 carbon atoms per molecule and are particularly suitable for the preparation of polyethylene. The polymerization may be carried out in the liquid phase, in the presence of a solvent or diluent, or even in the absence of such a solvent or diluent.

The polymerization temperature may vary within wide limits, and in general from $-80°$ C. to $200°$ C., preferred values being within the range $30°$ C. to $100°$ C.

The pressure applied during the polymerization may vary from 1 to 30 kg/cm$^2$ and preferably from 3 to 30 KG/cm$^2$. The catalysts of the present invention have, in every case, a high activity within a modest range of pressures, for example of the order of 5 kg/cm$^2$. The average molecular weight of the polymer may be influenced not only by the composition of the support but also by introducing regulators, such as alkyl halides or organometallic compounds of zinc and cadmium, into the reaction medium or by carrying out the polymerization in the presence of hydrogen.

In every case, it is possible to control the characteristics of the polyethylene produced with certainty to desired values within the following ranges: Melt-Index from 0.1 to 20 (DIN 53735) crystallinity from 50 to 84% and density from 0.938 to 0.97 g/ml (DIN 53479). In view of this range of characteristics, polyethylenes may be made by the present invention which are suitable for any type of working, such as extrusion, blow-moulding and the like.

The invention will now be illustrated by means of the following non-limitative, experimental examples.

EXAMPLE 1

27 Grams of anhydrous magnesium chloride in scale form are mixed with 4.82 g of ammonium fluoride under dry conditions for 30 minutes in a glass container which has previously been dried and is provided with an agitator and a porous septum. 100 ml of n-dodecane and 150 ml of ethanol are then added dropwise. After the addition, the mixture is maintained for one hour at ambient temperature, the temperature is then raised to $110°$ C. and the mixture is maintained under reflux until a perfectly clear solution is obtained. The residual alcohol is then evaporated from the solution at $130°$ C. for eight hours. The support obtained as a residue has a grain size of the order of 35 microns and contains 6.7% by weight of fluorine and 6.3% by weight of alcoholic hydroxyl groups. The ammonium ion content is 5.05% by weight. Furthermore the support has a porosity of 0.74 ml/g and a specific surface area of 70 m$^2$/g. This support is impregnated with 10 ml of titanium tetrachloride for four hours at $100°$ C. The excess titanium tetrachloride is then filtered off and the solid is washed five times, each with a 100 ml portion of n-dodecane. The resulting product is in the form of hexagonal scales and has a fluorine content of 6.0% by weight and a free alcoholic hydroxyl group content of 3.7% by weight. The ammonium ion content is 5.5% by weight and the titanium content is 1.85% by weight. The average grain size of the product is 35 microns.

10 mg of this catalytic component are introduced into two liters of n-heptane containing 1 ml of triethylaluminium and the whole is loaded into a steel autoclave having a volume of four liters and provided with an agitator.

The polymerization is carried out at $92°$ C. under a total pressure of 5 kg/cm$^2$ (3.5 kg/cm$^2$ of ethylene and 1.5 kg/cm$^2$ of hydrogen). The reaction is interrupted after two hours, at which time the catalyst is still active, and 400 g of white polyethylene having the following characteristics are discharged:

Melt-Index = 1
Density = 0.95 g/ml.

Furthermore the activity of the catalyst is 1081 kg of polyethylene per gram of titanium per hour, and the productivity is 20,000 grams of polyethylene per gram of catalyst per hour.

EXAMPLE 2

(Control)

The support is prepared exactly as described in Example 1 except that the ammonium fluoride is omitted. The support thus obtained has an alcoholic hydroxyl group content of 8.5% by weight, a porosity of 0.5 ml/g and a surface area of 40 m$^2$/g.

The support is impregnated with titanium tetrachloride as in Example 1 and the catalytic component obtained is in the form of hexagonal scales with an average grain size of the order of 35 microns, and has a titanium content of 5.0% by weight and a free alcoholic hydroxyl group content of 4.8% by weight.

Ethylene is polymerized with 10 mg of this catalytic component and with 1 ml of triethylaluminium under the conditions shown in Example 1. After two hours of reaction, 175 g of polyethylene are obtained having the following characteristics:

Melt-Index = 3
Density = 0.96 g/ml.

The productivity and the activity of the catalyst are 8750 and 175 respectively, given in the units indicated above.

EXAMPLE 3

200 Liters of a solution of the components of the support are prepared as in Example 1 using n-heptane in place of n-dodecane. This solution is atomized in a NYRO ATOMIZER sprayer using anhydrous nitrogen as the heating gas with an inlet temperature of the gas of $160°$ C. and an outlet temperature of $110°$ C. Moreover the rate of spraying is about 20 liters of solution per hour.

In this manner a support is obtained in the form of spherical particles having an average size of the order of 50 microns, a porosity of 0.82 ml/g and a specific surface area of 70 m$^2$/g. Furthermore, the support has an alcoholic hydroxyl group content of 5.5% by weight, a fluorine content of 7.5% by weight and an ammonium ion content of 6.0% by weight.

20 g of this support are treated with titanium tetrachloride by the method shown in Example 1. Thus a catalytic component is obtained in the form of spheroidal granules having an average diameter of 50 microns, a titanium content of 1.5% by weight, a fluorine content of 7.6% by weight and an alcoholic hydroxyl group content of 4.0% by weight.

Ethylene is polymerised with 10 mg of this catalytic component and with 1 ml of triethylaluminum under the conditions shown in Example 1,380 g of polyethylene being obtained with the following characteristics:
Melt-Index=0.9
Density=0.947 g/ml.

The productivity and the activity of the catalyst are thus 19,000 and 1267 respectively, the units being as indicated above.

EXAMPLE 4

The support is prepared as in Example 1 by evaporating the solution of the support components at 200° C. for eight hours. Thus a support is obtained which has an alcoholic hydroxyl group content of 0.7% by weight, a fluorine content of 4.9% by weight and an ammonium ion content of 3.1% by weight. Furthermore, the support has a porosity of 0.8 ml/g and a specific surface area of 25 m$^2$/g.

By impregnating the support as shown in Example 1, a catalytic component is obtained containing 0.9% by weight of titanium, 5% by weight of fluorine and 0.4% by weight of alcoholic hydroxyl groups, the support being in the form of hexagonal scales having an average size of 10 microns. Polymerization being carried out as in Example 1, 76 g of polyethylene are obtained having the following characteristics:
Melt-Index=0.5
Density=0.95 g/ml.

The productivity and the activity of the catalyst are thus 3,800 and 422 respectively, the units being as indicated above.

EXAMPLE 5

27 g of powdered magnesium chloride are added to 10 g of ammonium fluoride. Mixing is carried out for 30 minutes at ambient temperatures. To the homogenised mixture are added dropwise 100 ml of anhydrous n-dodecane and 200 ml of ethanol. The mixture is maintained at a temperature of 25° C. for one hour and then heated to 120° C. to obtain a clear solution. The solution is evaporated at 120° C. for nine hours. Thus a support is obtained having a fluorine content of 13.05% by weight, an alcoholic hydroxyl group content of 0.6% by weight and an ammonium ion content of 10.75% by weight. The porosity of the support is 0.53 ml/g and the specific surface area is 50 m$^2$/g.

The support is treated with 5 ml of titanium tetrachloride at 130° C. for five hours and a catalytic component is obtained having 1.5% by weight of titanium, 0.07% by weight of alcoholic hydroxyl groups, 12.05% by weight of fluorine and 9.75% by weight of ammonium ions. The catalytic component is in the form of hexagonal scales with an average size of 15 microns.

Ethylene is polymerized with 10 mg of this catalytic component and with 1 ml of triethylaluminum under the conditions shown in Example 1.70 g of polyethylene are obtained having the following characteristics:
Melt-Index=0.2
Density=0.94 g/ml.

The productivity and the activity of the catalyst are thus 3,500 and 233 respectively, the units being as indicated above.

EXAMPLE 6

25 g of anhydrous magnesium chloride are admixed with 100 ml of n-dodecane at ambient temperature. 150 ml of ethyl alcohol are then added dropwise. During the addition of the alcohol, gaseous hydrogen fluoride is bubbled through the mixture at a rate of 25 liters/hour.

At the end of the addition the temperature is brought to 110° C., a perfectly clear solution being obtained which is brought to dryness at 140° C. for eight hours.

The support obtained as a residue has a fluorine content of 2.0% by weight, an alcoholic hydroxyl group content of 6.6% by weight, an average grain size of the order of 20 microns, a porosity of 0.6 g/ml and a specific surface area of 60 m$^2$/g.

The support is impregnated under the conditions shown in Example (1), thus obtaining a catalytic component with an average size of 20 microns, containing 4.0% by weight of alcoholic hydroxyl groups, 2.5% by weight of fluorine, and 3.0% by weight of titanium.

By polymerizing the ethylene in the manner described in Example 1,200 g of polymer are obtained having the following characteristics:
Melt-Index=1.8
Density=0.968 g/ml.

The productivity and the activity of the catalyst are thus 10,000 and 333 respectively, the units being as indicated above.

EXAMPLE 7

25 kg of anhydrous magnesium chloride are treated with 100 liters of anhydrous n-heptane containing 1.79 kg of NH$_4$F.HF.

To the suspension obtained are added 150 liters of anhydrous ethanol. The mixture is maintained at ambient temperatures for one hour under agitation and is then heated to 100° C. Thus a clear solution is obtained which is fed to a NYRO ATOMISER sprayer which has a nitrogen circuit. The inlet temperature of the nitrogen is 200° C. and the outlet temperature is 120° C. The feed rate of the solution is 20 liters/hour. The support thus obtained has a fluorine content of 3.4% by weight, an alcoholic hydroxyl group content of 7.3% by weight, an ammonium ion content of 1.6% by weight, a porosity of 0.87 ml/g, a specific surface area of 65 m$^2$/g and an average grain size of 40 microns.

By impregnating the support with titanium tetrachloride as shown in Example 1, a catalytic component is obtained having a fluorine content of 4.15% by weight, an alcoholic hydroxyl group content of 2.7% by weight, a titanium content of 2.0% by weight and an ammonium ion content of 2.5% by weight.

The ethylene is polymerized with 10 mg of this component and with 1 ml of triethylaluminum under the conditions shown in Example 1. After two hours of polymerization, 480 g of polyethylene are obtained having the following characteristics:
Melt-Index=0.7
Density=0.96 g/ml.

The productivity and the activity of the catalyst are thus 24,000 and 1,200 respectively, the units being as given above.

EXAMPLE 8

30 Grams of powdered, anhydrous magnesium chloride with an average grain size of 60 microns are mixed with three grams of ammonium fluoride under dry conditions. 100 ml of n-dodecane are added to the mixture obtained. The temperature being maintained at about 20° C. and an over-pressure of 0.5 kg/cm$^2$ being applied by means of nitrogen, a solution containing 90 ml of n-dodecane and 10 ml of ethyl alcohol is added gradually over two hours. During the addition, the mass is maintained under strong agitation. At the end of the addition the mass is left to rest for one hour at ambient temperatures and is then heated under pressure for one hour at 110° C.

After separation of the n-dodecane, a support is obtained with the following characteristics: alcoholic hydroxyl group content of 7.2% by weight, fluorine content of 3.6% by weight, ammonium ion content of 3% by weight, porosity of 0.65 ml/g and specific surface area of 50 m$^2$/g.

The support is impregnated with the stoichiometric quantity of titanium tetrachloride, operating in heptane at 100° C. for a time of 6 hours.

Thus a catalytic component is obtained in the form of granules having an average grain size of 60 microns, a titanium content of 5% by weight, an alcoholic hydroxyl group content of 0.9% by weight, a fluorine content of 5% by weight and an ammonium ion content of 4.2% by weight.

Ethylene is polymerized with 10 mg of this catalytic component and with 1 ml of triethylaluminum under the conditions shown in Example 1. After two hours of polymerization, 550 g of polyethylene are obtained having the following characteristics:

Melt-Index = 0.1

Density = 0.938 g/ml.

The productivity and the activity of the catalyst are thus 27,500 and 550 respectively, the units being as indicated above.

We claim:

1. A Ziegler catalytic system formed by the combination of an organometallic compound of a metal of Group I, II or III of the Periodic System of the Elements and a catalytic component formed of a compound of a transition metal of Group IV, V or VI of said Periodic System supported on a carrier, characterized in that said carrier is an active solid complex obtained by reacting magnesium chloride with an aliphatic alcohol and a fluorine-containing compound at a temperature of from about 100° C. to about 200° C., said complex comprising from 2 to 15% by weight of fluorine and from 0.4 to 11% by weight of alcoholic hydroxyl groups.

2. The catalytic system of claim 1, wherein said fluorine-containing compound is selected from the group consisting of hydrogen fluorine, ammonium fluoride, phosphorus fluorides, fluorine and mixtures thereof.

3. The catalytic system of claim 1, wherein said aliphatic alcohol contains from 1 to 5 carbon atoms per molecule.

4. The catalytic system of claim 1, wherein said aliphatic alcohol is ethanol.

5. The catalytic system of claim 1, wherein said complex comprises from 3 to 10% by weight of fluorine and from 4 to 9% by weight of alcoholic hydroxyl groups.

6. The catalytic system of claim 1, wherein said complex is prepared by contacting said magnesium chloride, said aliphatic alcohol and said fluorine-containing compound, possibly in the pressure of a liquid diluent, and heat-treating the resulting mixture at a temperature of from 100° to 200° C.

7. The catalytic system of claim 6, wherein any aliphatic alcohol in excess is evaporated during said heat-treatment.

8. The catalytic system of claim 6, wherein said heat-treatment is carried out by spray-drying.

9. The catalytic system of claim 1, wherein the reaction is carried out at a temperature of from 120° to 160° C.

10. The catalytic system of claim 1, wherein the catalytic component is prepared by reacting said transition metal compound with said active solid complex at a temperature of from 20° to 150° C.

11. The catalytic system of claim 10, wherein said transition metal compound is titanium tetrachloride.

12. The catalytic system of claim 1 or 11, wherein said catalytic component has a hydroxyl group content of from 0.03 to 5 wt.% and a fluorine content of from 1 to 14 wt.%.

13. The catalytic system of claim 1 or 11, wherein said catalytic component has a hydroxyl group content of from 0.5 to 4 wt.% and a fluorine content of from 3 to 8 wt.%.

14. The catalytic system of claim 1, wherein said catalytic component has a titanium content of from 0.05 to 15 wt.%.

15. The catalytic system of claim 14, wherein said titanium content is from 1 to 5 wt.%.

16. The catalytic system of claim 1, wherein the molar ratio between organometallic compound and transition metal compound is from 50:1 to 1000:1.

* * * * *